United States Patent Office
3,449,444
Patented June 10, 1969

3,449,444
SYNTHESIS OF DIALKYL PHENOLS
Mohammad Ali Habibi, Kansas City, Kans., assignor to Thompson-Hayward Chemical Company, Kansas City, Kans., a corporation of Delaware
No Drawing. Filed Jan. 24, 1966, Ser. No. 522,349
Int. Cl. C07c 37/14
U.S. Cl. 260—624                            4 Claims

ABSTRACT OF THE DISCLOSURE

A method of preparing dialkylphenols which comprises, incorporating a catalyst agent in the phenol starting material and elevating the temperature of the resultant mixture in the absence of oxygen; adding an excess amount of an olefin thereto at an elevated temperature in the absence of oxygen; removing the catalyst and excess reactants from said mixture; and cooling the resultant product to below about 50° C. prior to the exposure thereof to oxygen to yield the desired dialkyl phenol product.

---

This invention relates to and has as its object the provision of certain useful chemical compounds and novel processes for the production thereof. More particularly, this invention relates to novel processes useful in the production of certain organic compounds. Even more specifically, this invention relates to novel methods for the production of dialkyl phenol compounds, of the general formula:

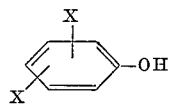

wherein each X may be the same or different and is alkyl, either straight or branched chain and possesses from about 3 to about 24 carbon atoms and most preferably from about 8 to about 14 carbon atoms. Examples of the dialkyl phenol compounds which may be produced by the novel processes of this invention include such compounds as dipropyl phenol, dibutyl phenols, diheptyl phenols, dioctyl phenols, dinonyl phenols, didodecyl phenols, and ditridecyl phenols.

Heretofore, in the production of dialkyl phenol compounds certain disadvantages existed. These prior art products usually contained a substantial amount of impurities for example, unreacted reagents and undesirable side products. In addition, these impurities caused the final product to have an undesirable yellowish color which could not be satisfactorily employed for certain purposes, e.g. the manufacture of detergents, vinyl stabilizers, plasticizers, antioxidants, corrosion inhibitors, and phenolic resins. Another disadvantage of the prior procedures employed in the production of acceptable dialkyl phenol products was the fact that they were commercially unattractive as they were both technically cumbersome and excessively expensive, since dialkyl phenols were purified by combination of treatments, such as water washing, neutralization of catalyst with alkali, filteration, and vacuum distillation of the product.

It has now been found that by employing the novel procedures of the instant invention, dialkyl phenols may be produced in a manner which overcomes and obviates the disadvantages heretofore existent in their production. It is an object of this invention to prepare dialkyl phenols which are substantially free from undesirable impurities.

Another object of this invention is the preparation of dialkyl phenols possessing desirable physical and chemical characteristics.

An even further object of this invention is the provision of novel methods of preparing the dialkyl phenol compounds of this invention which are commercially attractive and efficient.

Still other objects of this invention will become apparent from a further reading of the instant specification.

It has been discovered that the dialkyl phenol compounds of this invention may be satisfactorily prepared by the novel processes of this invention which entail a number of steps beginning with phenol as a starting material.

In the first step of the novel processes of this invention, a small but effective amount of a catalyst agent is incorporated into the phenol starting material, for example by stirring.

The catalyst agent which may be satisfactorily empolyed in the practice of this invention may be any one of several different ones known to the art. The catalyst agent, therefore, may be selected from the group consisting of volatile acid type catalysts, for example, hydrogen chloride, hydrogen fluoride, and phosphorus trioxide; or volatile metal halide catalysts, for example boron trifluoride or stannic chloride. Most satisfactory results have been found to be obtained when the metal halide catalysts, e.g. boron trifluoride, are employed in the practice of this invention, although the other catalyst agents also provide satisfactory results.

The amount of catalyst agent which is required to be employed in the practice of this invention has been found to vary in accordance with the specific catalyst agent employed. However, generally speaking, satisfactory results are obtained when an amount of catalyst agent of from about 0.1 percent to about 10.0 percent by weight of the phenol starting material is utilized, and optimally when the amount catalyst agent used herein represents from about 1.0 percent to about 2.0 percent by weight of the phenol starting material.

Upon thorough incorporation of the catalyst agent into the phenol starting material, the temperature of the resultant mixture is elevated substantially, to from about 50 to 100 degrees centigrade and preferably from about 55 to about 75 degrees centigrade. This temperature elevation may be accomplished in any manner known to the art, for example by heating, although it has been found necessary that this and the following procedures of the novel process of this invention be carried out in the absence of oxygen. This may be accomplished by performing these operations under a blanket of inert gas, for example nitrogen, carbon dioxide, or methane gas.

The resultant mixture, at the elevated temperature is then reacted with an excess amount of desired olefin to dialkylate the phenol starting material. This dialkylation is accomplished by slowly adding the desired olefin to the hot phenol-catalyst agent mixture, with agitation, for example by constant stirring. During this dialkylation process the reaction mixture is continually agitated and its temperature is maintained at an elevated level, for example from between about 50 to about 100 degrees centigrade. In addition, this procedure is carried out entirely in the absence of oxygen.

The olefins which may be successfully employed in the practice of this invention may be any aliphatic hydrocarbon which will provide the desired alkylated phenol product. Thus, there may be employed such olefins as propylene, isobutylene, heptenes, octenes, nonenes, decenes, dodecenes, and tridecenes; and the corresponding linear isomers thereof, for example, n-butenes, n-heptenes, n-octenes, n-nonenes, n-decenes, and n-tridecenes. By an "excess amount" of the olefin reactant it is meant that there must be employed an amount of the olefin greater than the stoichiometric amount ordinarily required for the reaction with phenol. For example 1.0 mole of phenol may be alkylated with up to 2.8 moles of olefin to prepare the dialkyl phenol.

Upon completion of the dialkylation reaction, the excess reactants, i.e. unreacted phenol and/or excess olefin, and the catalyst agent are removed from the finished product. This may be accomplished in any suitable manner known to the art, for example, by vacuum distillation. After removal of any of the excess reactants present and the catalyst agent, the final product is allowed to cool to a temperature below about 50° C. before exposure to an oxygen atmosphere. In the event the excess reactant and the catalyst agent are removed from the final product by vacuum distillation, after removal, the vacuum is first released by an inert gas, for example, nitrogen, to atmospheric pressure, and the product is allowed to cool to a temperature below about 50° C. before exposure thereof to an oxygen atmosphere to yield the desired near water-white, crystal clear dialkyl phenol compound essentially free from undesirable impurities.

The dialkyl phenol compounds prepared in accordance with the novel procedures of the instant invention are substantially free of undesirable impurities and possess those desirable physical and chemical characteristics which render them desirably useful in all areas of utility; i.e. the product is high in purity, near water-white in color, and clear in appearance. In addition, such costly procedures as removal of the catalyst agent by neutralization or water washing have been eliminated resulting in a substantial reduction in the economic cost of the product.

The invention may be further illustrated by the following examples:

EXAMPLE 1

To 94 gm. of phenol in a 500 ml. flask is added with stirring, 1.5 gm. of boron trifluoride. The resultant mixture is heated under a nitrogen blanket to a temperature of 65° C. To this heated mixture is slowly added with continuous stirring 302 gm. of tripropylene. The temperature of this reaction mixture is maintained at 60° C., and the resultant reaction mixture is agitated as by continuous stirring for additional 3 hours. The reaction mixture is then subjected to vacuum distillation to remove unreacted phenol, excess tripropylene and the boron trifluoride. The vacuum is released by nitrogen gas to atmospheric pressure, and the dinonyl phenol product is allowed to cool to room temperature and then poured into storage containers. The analysis of the dinonyl phenol produced as follows:

|  | Percent |
|---|---|
| Dinonyl phenol | 94.0 |
| Phenol | <0.1 |

EXAMPLE 2

To 94 gm. of phenol in a 500 ml. flask is added with stirring 2.0 gm. of stannic chloride. The resultant mixture is heated under a nitrogen blanket to a temperature of 65° C. To this heated mixture is slowly added with continuous stirring 264 gm. of diisobutylene. The temperature of this reaction is maintained at 75° C., and the resultant reaction mixture is agitated as by continuous stirring for an additional 4 hours. The reaction mixture is subjected to vacuum distillation to remove unreacted phenol, excess olefin and stannic chloride. The vacuum is released with nitrogen gas to atmospheric pressure. The product is cooled to 40° C. before exposure of the product to air. The dioctyl phenol left in the flask had the following composition:

|  | Percent |
|---|---|
| Dioctyl phenol | 95.0 |
| Phenol | <.1 |

EXAMPLE 3

Following the procedure set forth in Example 1, but substituting 384 gm. of tetrapropylene in place of 302 gm. of propylene trimer, there is obtained didodecyl phenol having the following composition:

|  | Percent |
|---|---|
| Didodecyl phenol | 94.5 |
| Phenol | <.1 |

In addition to the dialkyl phenols mentioned hereinabove, mixed dialkyl phenols (wherein each X is different) may be prepared by alkylating phenol in the proportion of 1 mole to 2 moles of any of the following branched chain or linear olefins or mixtures thereof: propylene, butylene, pentene, hexene, heptene, octene, nonene, decene, undecene, dodecene, tridecene, tetradecene, pentadecene, hexadecene, heptadecene, octadecene, nonadecene, eicosene, heneicosene, docosene, tricosene, and tetracosene.

EXAMPLE 4

Following the procedure set forth in Example 1, but substituting 151 gm. of propylene trimer plus 182 gm. of diisobutylene for the 302 gm. of propylene trimer, the product obtained contained the following:

|  | Percent |
|---|---|
| Mixed octyl-nonyl phenol | 94.9 |
| Nonyl phenol | 2.5 |
| Octyl phenol | 2.5 |
| Phenol | <0.1 |

The invention may be variously otherwise embodied within the scope of the appended claims.

What is claimed is:
1. A method for preparing dialkyl phenol compounds of the formula:

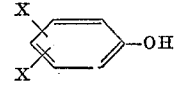

wherein each X is alkyl of from 3 to 24 carbon atoms; which comprises;
  (a) incorporating into phenol starting material a small but effective amount of a catalyst agent selected from the group consisting of hydrogen fluoride, hydrogen chloride, phosphorus trioxide, boron trifluoride and stannic chloride;
  (b) elevating and maintaining the temperature of the resultant mixture at from about 50 to about 100° C. in the absence of oxygen;
  (c) alkylating said heated mixture by adding thereto, in the absence of oxygen and at said elevated temperature, an amount of an olefin of from 3 to 24 carbon atoms in excess of the stoichiometric amount required for dialkylation;
  (d) removing from said alkylated mixture excess reactants and said catalyst agent; and
  (e) cooling said resultant product to a temperature below about 50° C. prior to the exposure thereof to oxygen, to yield the desired dialkyl phenol product.

2. The method of claim 1, wherein the olefin contains from 8 to 14 carbon atoms, and each X is alkyl of from 8 to 14 carbon atoms.

3. The method of claim 1, wherein the catalyst is selected from the group consisting of boron trifluoride and stannic chloride.

4. The method of claim 1, wherein the catalyst is boron trifluoride.

References Cited

UNITED STATES PATENTS

| 2,593,112 | 4/1952 | Cross et al. | 260—624 |
| 2,698,867 | 2/1955 | Bos | 260—624 |
| 2,874,193 | 2/1959 | Dijkstra | 260—624 |
| 3,000,964 | 9/1961 | Milligan | 260—624 |

BERNARD HELFIN, Primary Examiner.

W. B. LONE, Assistant Examiner.